United States Patent
Lee (10) Patent No.: US 9,688,193 B2
(45) Date of Patent: Jun. 27, 2017

(54) SYSTEM AND METHOD FOR CONTROLLING LAMP IN VEHICLE

(71) Applicant: Hyundai Motor Company, Seoul (KR)

(72) Inventor: Hui Sung Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 57 days.

(21) Appl. No.: 14/855,029

(22) Filed: Sep. 15, 2015

(65) Prior Publication Data

US 2016/0250967 A1    Sep. 1, 2016

(30) Foreign Application Priority Data

Feb. 27, 2015 (KR) .................. 10-2015-0028389

(51) Int. Cl.
*H05B 37/02* (2006.01)
*B60Q 3/02* (2006.01)
*B60Q 3/80* (2017.01)

(52) U.S. Cl.
CPC ................... *B60Q 3/80* (2017.02)

(58) Field of Classification Search
CPC .... H05B 37/02; H05B 33/08; H05B 33/0812; H05B 33/0815; B60Q 3/0293; B60Q 3/80
USPC .............. 315/77–82, 291, 307, 308
See application file for complete search history.

(56) References Cited

U.S. PATENT DOCUMENTS

| 5,831,389 | A | * | 11/1998 | Kawashima | ......... B60Q 3/0293 307/10.8 |
| 6,133,827 | A | * | 10/2000 | Alvey | ................. B60Q 3/0293 340/438 |
| 7,880,390 | B2 | * | 2/2011 | Nagai | ..................... B60Q 3/80 315/77 |
| 2012/0235568 | A1 | * | 9/2012 | Prodin | ..................... B60Q 3/80 315/77 |

FOREIGN PATENT DOCUMENTS

| EP | 0770519 B1 | 4/2002 |
| JP | 2002114091 A | 4/2002 |
| JP | 2003525799 A | 9/2003 |
| JP | 2005193804 A | 7/2005 |
| KR | 10-0173740 | 10/1998 |
| KR | 20090097822 A | 9/2009 |
| KR | 10-1081131 A | 9/2010 |
| KR | 10-2010-0115966 | 10/2010 |
| KR | 20120062463 A | 6/2012 |
| KR | 101338685 B1 | 12/2013 |

\* cited by examiner

*Primary Examiner* — Jimmy Vu
(74) *Attorney, Agent, or Firm* — Brinks Gilson & Lione (57) ABSTRACT

A system and a method for controlling a lamp in a vehicle capable of recognizing turn on/off of the lamp in the vehicle when a driver or a passenger enters or exits the vehicle and improving sensitivity quality of the driver or the passenger by entering a breathing mode in which a lamp in the vehicle is repeatedly brightened and darkened at a specific period when the driver or the passenger enters or exits the vehicle and changing a period of a luminance of the lamp in proportion to a speed of the vehicle are provided. The system for controlling a lamp in a vehicle includes: a lamp control- (Continued)

ling unit configured to receive a door opening signal or a door closing signal of the vehicle or receive a start on or off signal of the vehicle and to change a mode of the lamp into a standby mode, a breathing mode, or an operating mode; and a lamp configured to be driven by the lamp controlling unit.

13 Claims, 6 Drawing Sheets

SYSTEM AND METHOD FOR CONTROLLING LAMP IN VEHICLE

CROSS-REFERENCE TO RELATED APPLICATION

This application claims the benefit of priority to Korean Patent Application No. 10-2015-0028389, filed on Feb. 27, 2015, the disclosure of which is hereby incorporated by reference.

FIELD

The present disclosure relates to a system and a method for controlling a lamp in a vehicle, and more particularly, to a technology in which a lamp in a vehicle is repeatedly brightened and darkened at a specific period and luminance is changed depending on a speed of the vehicle.

BACKGROUND

The statements in this section merely provide background information related to the present disclosure and may not constitute prior art.

Generally, a room lamp or a mood lamp among interior illumination devices of a vehicle, which is a lamp positioned at a ceiling portion, or the like, of the interior of the vehicle to entirely brighten the interior of the vehicle, basically has an on-mode in which it is always turned on, an off-mode in which it is always turned off, and a door-mode in which it is turned on in a state in which a door of the vehicle is opened.

Meanwhile, the mood lamp of the vehicle, which is a lamp for producing a dim mood in the interior of the vehicle at the time of driving the vehicle at a low illumination and various colors at night, is positioned at a predetermined position of the interior of the vehicle.

Recently, as the number of self-drivers is increased and a time consumed in the vehicle is increased, the use of the mood lamp has increased while paying much attention to an interior design of the vehicle unlike the past in which the vehicle was simply considered as a transportation means.

However, an interior illumination device according to the related art has a disadvantage that a driver should manually select a color and an illumination desired by him/her or turn on/off the interior illumination device depending on his/her selection.

SUMMARY

The present disclosure solves the above-mentioned problems occurring in the prior art while advantages achieved by the prior art are maintained intact.

An aspect of the present disclosure provides a system and a method for controlling a lamp in a vehicle capable of recognizing turn on/off of the lamp in the vehicle when a driver or a passenger gets in or gets off the vehicle and improving sensitivity quality of the driver or the passenger by entering a breathing mode in which the lamp in the vehicle is repeatedly brightened and darkened at a specific period when the driver or the passenger gets in or gets off the vehicle and changing a period of a luminance of the lamp in proportion to a speed of the vehicle.

Other objects and advantages of the present disclosure may be understood by the following description and will be more clearly appreciated by exemplary embodiments of the present disclosure. It may be easily appreciated that objects and advantages of the present disclosure may be realized by means mentioned in the claims and a combination thereof.

According to an exemplary embodiment of the present disclosure, a system for controlling a lamp in a vehicle includes: a lamp controlling unit configured to receive a door opening signal or a door closing signal of the vehicle or receive a start on or off signal of the vehicle to change a mode of the lamp into a standby mode, a breathing mode, or an operating mode; and a lamp configured to be driven depending on the lamp controlling unit.

The lamp controlling unit may include a breathing mode controlling unit adjusting a period of a luminance of the lamp.

The system for controlling a lamp in a vehicle may further include a selection switch allowing the lamp to be turned on or turned off depending on an input of a driver or a passenger in the vehicle.

A period of a luminance of the lamp may be adjusted depending on a speed of the vehicle.

The lamp controlling unit may change the mode of the lamp into the breathing mode when the lamp controlling unit receives the door opening signal or the door closing signal from the vehicle.

The lamp may repeatedly become bright and dark at a predetermined period while in the breathing mode, and the breathing mode may be maintained for dozens of seconds (for example thirty to fifty seconds) when other external inputs are not present.

According to another exemplary embodiment of the present disclosure, a method for controlling a lamp in a vehicle when a driver or a passenger gets in the vehicle includes: allowing the lamp in the vehicle to enter a standby mode; controlling, by a lamp controlling unit, the lamp in the vehicle to enter a breathing mode when a door of the vehicle is opened; and allowing the lamp to enter an operating mode when a predetermined time elapses in a state in which the lamp in the vehicle is in the breathing mode and allowing the lamp to immediately enter the operating mode when an external input is received or the vehicle starts on before the predetermined time elapses in the state in which the lamp in the vehicle is in the breathing mode.

A period of a luminance of the lamp may be adjusted depending on a speed of the vehicle.

The lamp may be selected to be turned on or turned off depending on an external input of the driver in the vehicle.

In the breathing mode, the lamp may repeatedly become bright and dark at a predetermined period, and the breathing mode may be maintained for dozens of seconds.

According to still another exemplary embodiment of the present disclosure, a method for controlling a lamp in a vehicle when a driver or a passenger gets off the vehicle includes: maintaining, by a lamp controlling unit, an operating mode of the lamp when the ignition of the vehicle is turned off; continuously maintaining, by the lamp controlling unit, the operating mode of the lamp when a door of the vehicle is opened; controlling, by the lamp controlling unit, the lamp in the vehicle to enter a breathing mode when the door of the vehicle is closed; and allowing the lamp to enter a standby mode when a predetermined time elapses in a state in which the lamp in the vehicle is in the breathing mode.

When the door of the vehicle is opened before the predetermined time elapses in the state in which the lamp in the vehicle is in the breathing mode, the lamp may enter a mode depending on an operation for controlling the lamp in the vehicle at the time of getting in the vehicle.

The lamp may be selected so as to be turned on or turned off depending on an external input of the driver or the passenger in the vehicle.

In the breathing mode, the lamp may repeatedly become bright and dark at a predetermined period, and the breathing mode may be maintained for dozens of seconds.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The above-mentioned objects, features, and advantages will become more obvious from the following description described below in detail with reference to the accompanying drawings. Therefore, those skilled in the art to which the present disclosure pertains may easily practice a technical idea of the present disclosure. Further, in describing the present disclosure, in the case in which it is judged that a detailed description of a well-known technology associated with the present disclosure may unnecessarily make the gist of the present disclosure unclear, it will be omitted. Hereinafter, exemplary embodiments of the present disclosure will be described in detail with reference to the accompanying drawings.

Figure 1:
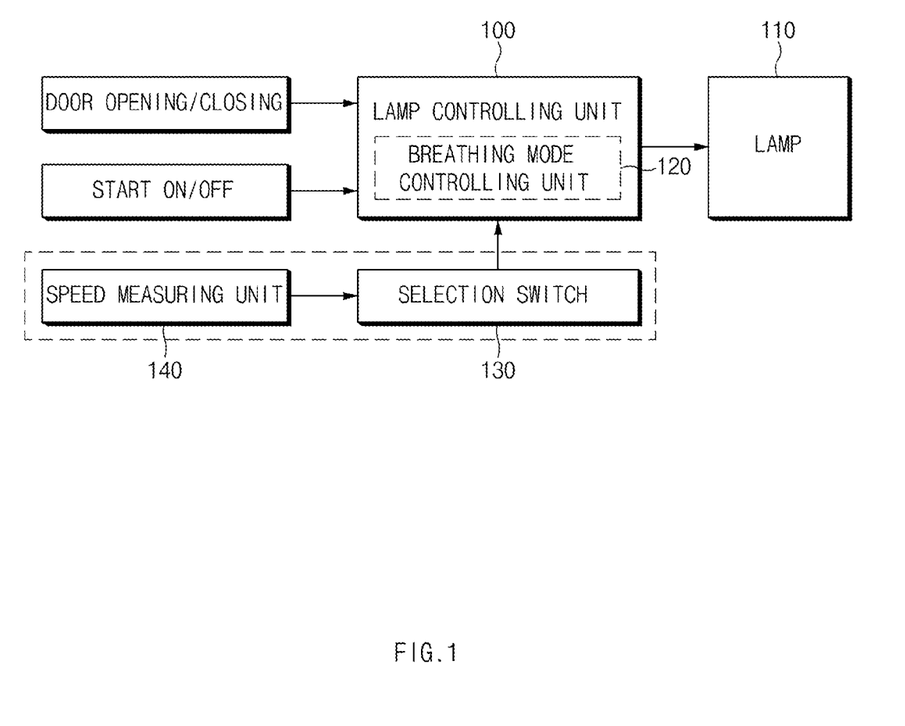
FIG. 1 is a block diagram of a configuration of a system for controlling a lamp in a vehicle.

FIG. 1 is a block diagram of a configuration of a system for controlling a lamp in a vehicle. In FIG. 1, the system for controlling a lamp in a vehicle includes a lamp controlling unit 100 and a lamp 110. Here, the lamp controlling unit 100 may further include a breathing mode controlling unit 120 that may control a breathing mode. Particularly, the breathing mode controlling unit 120 may adjust a breathing mode period.

When the lamp controlling unit 100 receives a door opening signal or a door closing signal of the vehicle or receives a start on or off signal of the vehicle, it changes a mode of the lamp 110 into, for example, a standby mode, a breathing mode, or an operating mode.

Here, the door opening or closing signal of the vehicle and the start on or off signal of the vehicle are generated using a sensor provided in the vehicle and are transmitted to the lamp controlling unit 100.

The lamp controlling unit 100 classifies the mode of the lamp 110 into the standby mode, the breathing mode, or the operating mode depending on the received signal to control an operation of the lamp 110 connected thereto.

First, the standby mode, which is a state in which an external input is not present, is a state in which all of the lamps 110 in the vehicle are turned off, and may be changed into the breathing mode when the external input is input.

Next, in the breathing mode, which is a mode in which the lamp 110 in the vehicle is operated in real time so that brightness of the lamp 110 becomes bright and dark at a predetermined period, an operation of brightness and darkness of the lamp 110 is maintained for dozens of seconds when the external input is not present and a mode of the lamp 110 is changed into the standby mode or the operating mode when a maintenance time of the breathing mode ends.

Next, the operating mode, which is a mode in which a general operation of the lamp 110 is possible, is a mode in which the lamp 110 is turned on or off depending on the external input.

In addition, the lamp controlling unit 100 may receive a signal from a selection switch 130 that may control the standby mode, the breathing mode, and the operating mode among modes of the lamp 110 by a driver or a passenger and a signal from a speed measuring unit 140 that may measure a speed of the vehicle.

That is, after the mode of the lamp 110 is changed into the breathing mode by the lamp controlling unit 100, the driver or the passenger may adjust a maintenance time of the breathing mode of the lamp 110 using the selection switch 130 or a luminance of the lamp 110 in the breathing mode may be adjusted depending on the speed of the vehicle measured by the speed measuring unit 140 in the vehicle.

The lamp 110 is turned off or turned on depending on the lamp controlling unit 100 or is driven while being repeatedly brightened or darkened at a predetermined period. Generally, the lamp in the vehicle may include a map lamp or a room lamp.

Figure 2A:
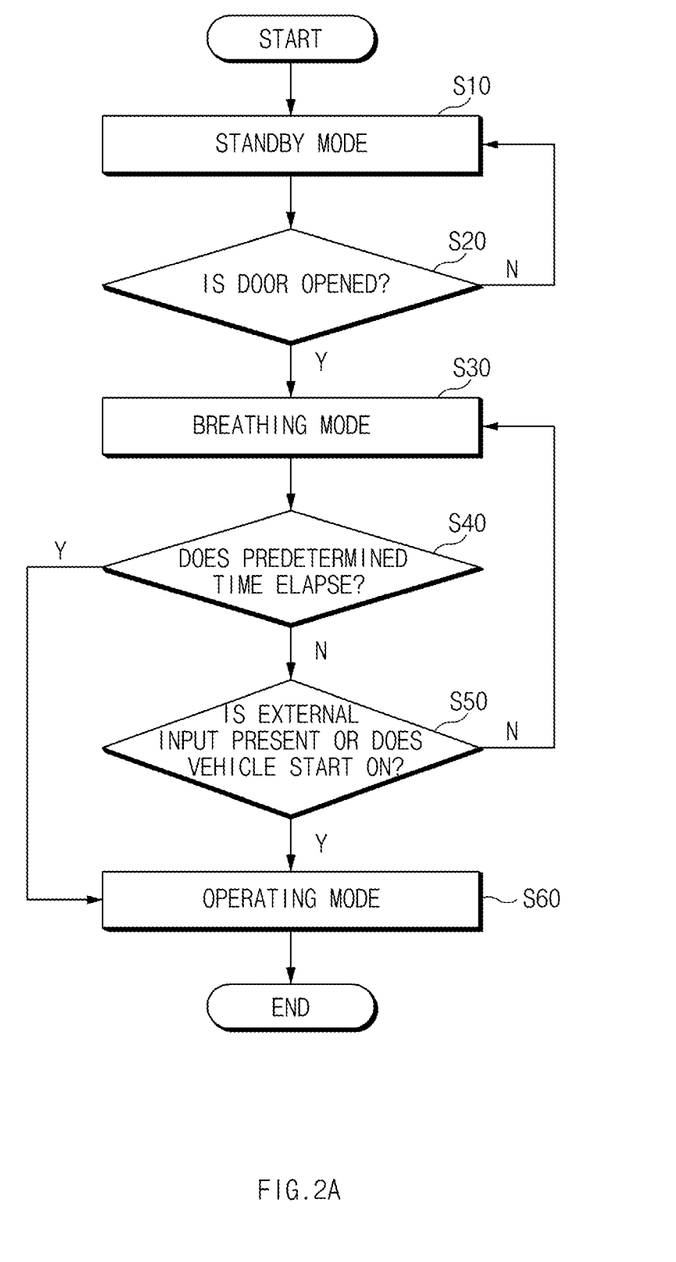
FIG. 2A is a flow chart of a method for controlling a lamp in a vehicle when a driver or a passenger enters the vehicle.

Referring to FIG. 2A, which illustrates one method for controlling a lamp in a vehicle when a driver or a passenger enters the vehicle, it is assumed that the lamp in the vehicle enters the standby mode during which an external input is not present (S10).

First, when the driver or the passenger opens a door in order to enter the vehicle (S20), the lamp controlling unit 100 of the vehicle receives the door opening or closing signal of the vehicle to control the lamp 110 in the vehicle to enter the breathing mode (S30). While in the breathing mode, the lamp in the vehicle is operated in real time so that the brightness of the lamp becomes bright and dark at a predetermined period. The operation of brightness and darkness of the lamp 110 may be maintained for dozens of seconds when the external input is not present.

Next, when a predetermined time (for example, thirty to fifty seconds) elapses in a state in which the lamp in the vehicle is maintained in the breathing mode (S40), the lamp enters the operating mode (S60). Here, the operating mode, which is a mode in which the lamp may be controlled, means that the breathing mode ends. Here, in order to change the mode of the lamp from the breathing mode into the operating mode, the predetermined time or a period may be adjusted by the driver or the passenger of the vehicle.

However, when an external input is received or the vehicle starts on before the predetermined time (thirty to fifty seconds) elapses in the state in which the lamp 110 in the vehicle is maintained in the breathing mode (S50), the lamp 110 may immediately enter the operating mode (S60). That is, even though the predetermined time (thirty to fifty seconds) does not elapse, when the external input is received or the vehicle starts on; the lamp 110 may immediately enter the operating mode by the lamp controlling unit 100.

Here, the external input may be a signal generated by allowing the driver or the passenger to actively control the breathing mode using a selection switch 130.

Figure 2B:
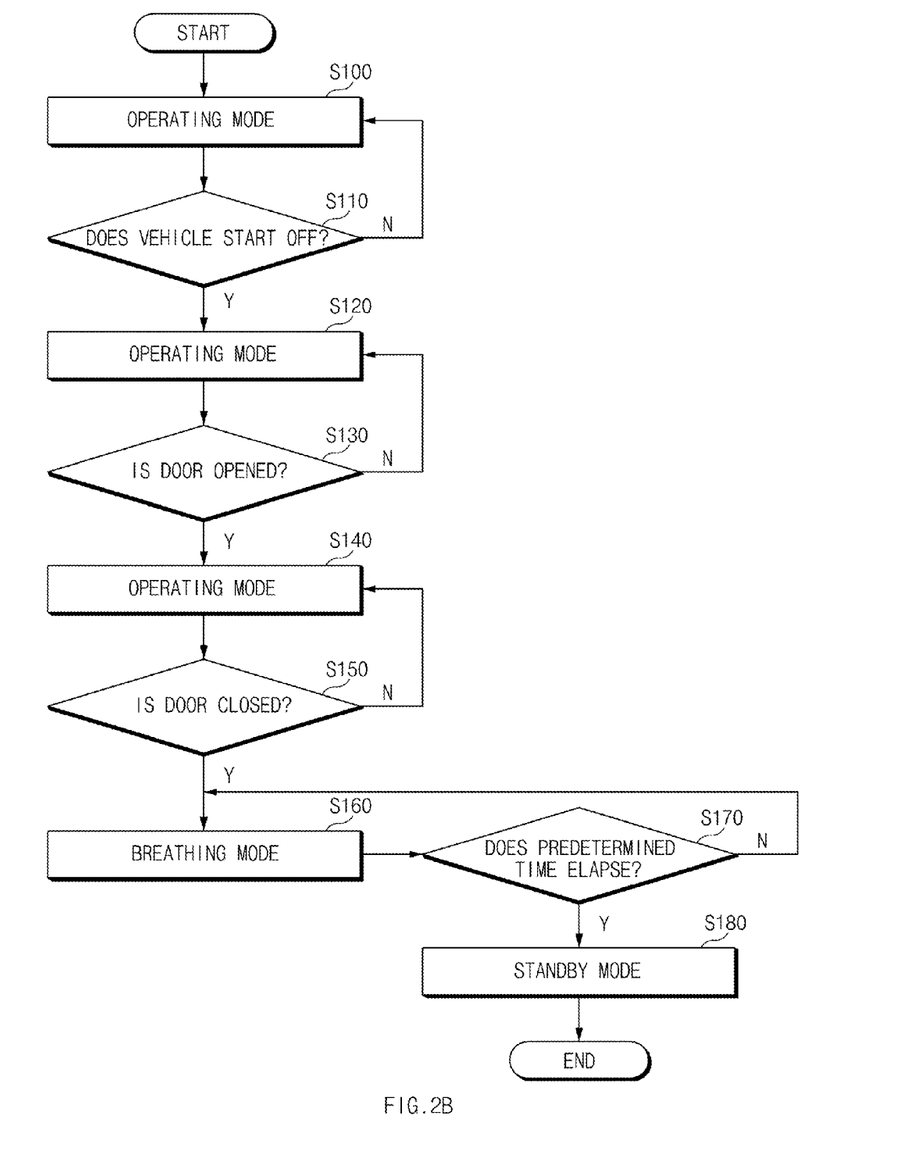
FIG. 2B is a flow chart of a method for controlling a lamp in a vehicle when a driver or a passenger exits the vehicle.

Referring to FIG. 2B, which illustrates one method for controlling a lamp in a vehicle when a driver or a passenger exits the vehicle, it is assumed that the lamp in the vehicle, may be turned on or turned off.

In addition, in the method for controlling a lamp in a vehicle when a driver or a passenger exits the vehicle, the lamp may enter the breathing mode only through a series of processes in which the ignition of the vehicle is turned off and the door of the vehicle is opened and then closed. That is, the lamp controlling unit 100 may recognize that the driver or the passenger exits the vehicle only when all of the ignition turn off signal of the vehicle and the door opening or closing signal of the vehicle are present.

First, when the driver turns off the ignition of the vehicle in order to exit the vehicle in a state in which the lamp 110 in the vehicle is in the operating mode, the lamp controlling unit 100 of the vehicle maintains the operating mode of the lamp 110 in the vehicle (S100 to S120).

Next, when the driver or the passenger opens the door in order to exit the vehicle, the lamp controlling unit 100 of the vehicle continuously maintains the operating mode of the lamp 110 in the vehicle (S130 and S140).

Next, when the driver or the passenger closes the door after exiting the vehicle, the lamp controlling unit 100 of the vehicle receives the door closing signal to control the lamp 110 in the vehicle to enter the breathing mode (S150 to S160). While in the breathing mode, the lamp in the vehicle is operated in real time so that the brightness of the lamp becomes bright and dark at a predetermined period. The operation of brightness and darkness of the lamp 110 may be maintained for dozens of seconds when the external input is not present.

Next, when a predetermined time (thirty to fifty seconds) elapses in a state in which the lamp 110 in the vehicle is maintained in the breathing mode (S170), the lamp enters the standby mode (S180).

Here, the standby mode, which is a state in which the external input is not present, means a state in which all of the lamps 110 in the vehicle are turned off. That is, it means that the driver or the passenger completely exits the vehicle, such that the lamp 110 in the vehicle is changed into a state in which it does not need to be operated.

Here, in order to change the mode of the lamp 110 from the breathing mode into the standby mode, setting of the predetermined time or a period may be adjusted by the driver or the passenger of the vehicle.

However, when the door of the vehicle is opened before the predetermined time (thirty to fifty seconds) elapses in the state in which the lamp 110 in the vehicle is in the breathing mode, the lamp 110 may be controlled in the same sequence as a sequence at the time of getting in the vehicle.

Figure 3A:
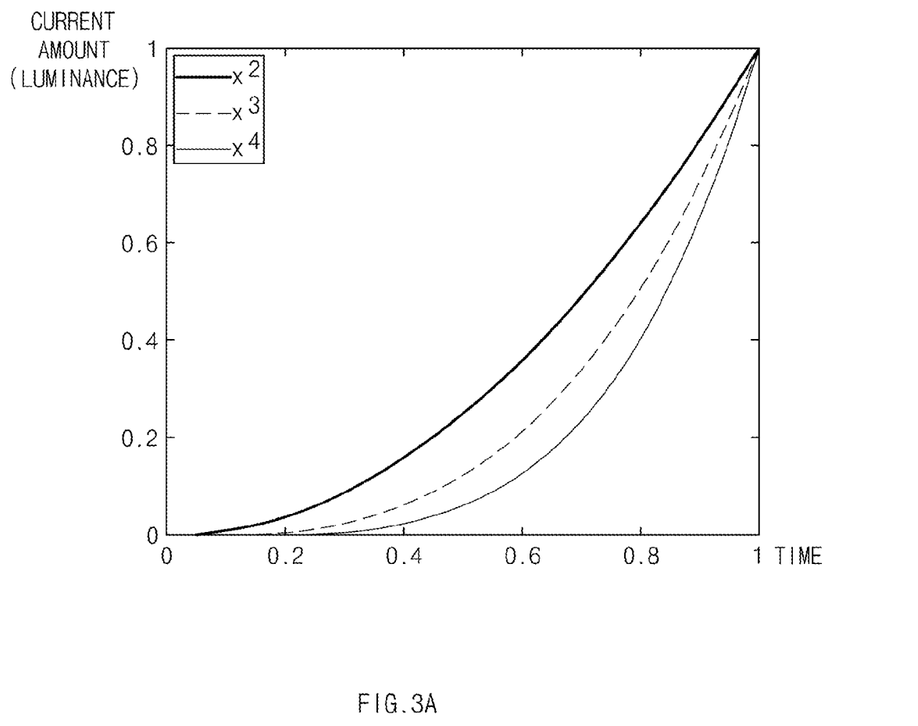
FIGS. 3A and 3B are graphs illustrating brightness of a lamp over time in implementations of a system for controlling a lamp in a vehicle.

FIG. 3A is a graph illustrating a form in which a luminance of the lamp is increased depending on a time change, such that the lamp gradually becomes bright.

For example, the luminance of the lamp may be controlled by an electrical current amount, and be increased in proportion to the current amount. The luminance of the lamp may be adjusted to improve sensitivity quality of the driver or the passenger.

Figure 3B:
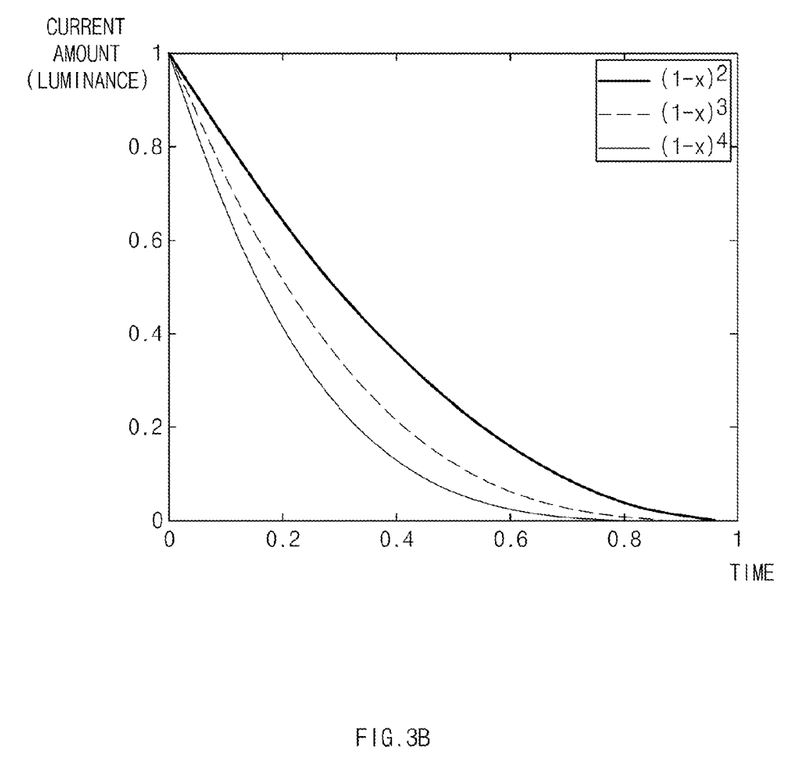

FIG. 3B is a graph illustrating a form in which a luminance of the lamp is decreased depending on a time change, such that the lamp gradually becomes dark.

For example, the luminance of the lamp may be controlled by an electrical current amount, and be decreased in proportion to the current amount. The luminance of the lamp may be adjusted to improve sensitivity quality of the driver or the passenger.

Figure 4:
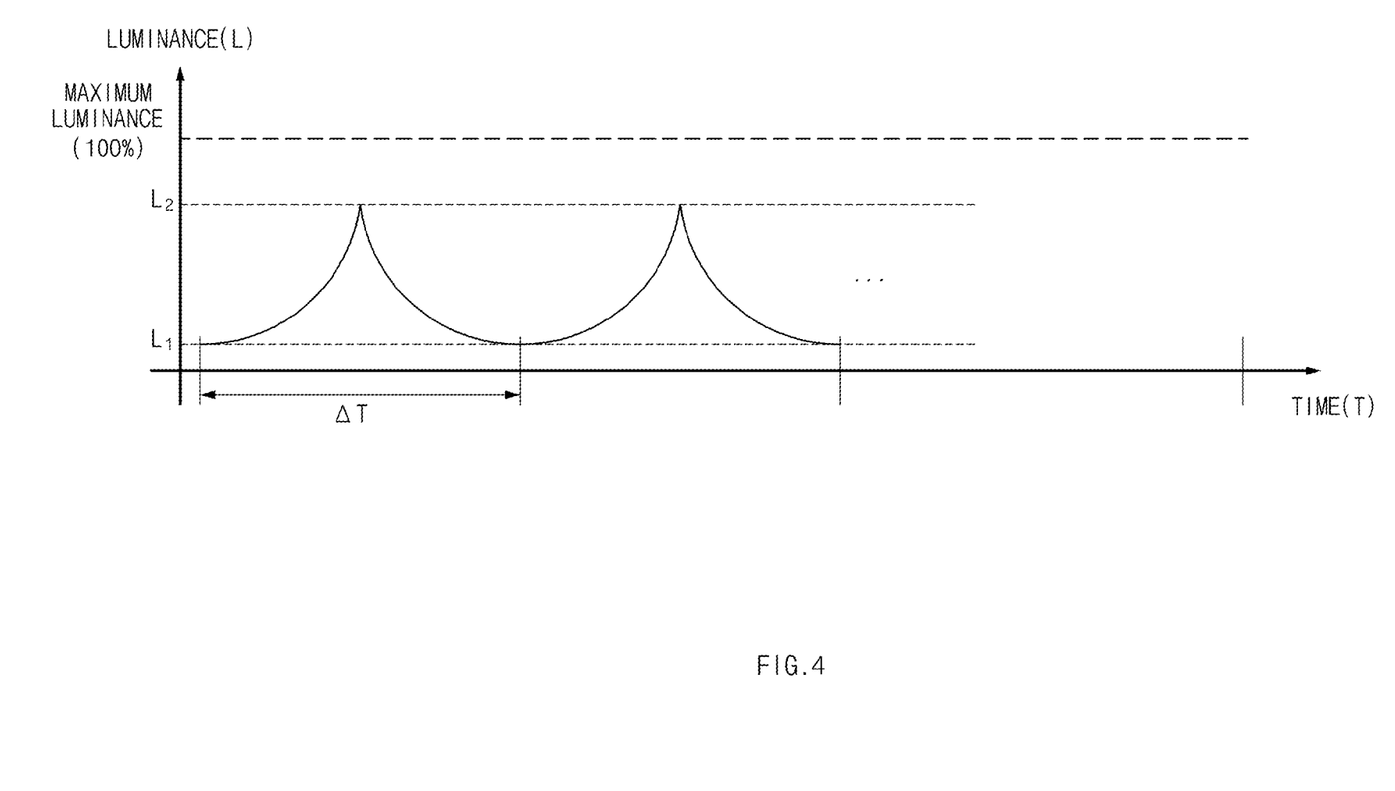
FIG. 4 is a graph illustrating a luminance of a lamp in a breathing mode over time in implementations of a method for controlling a lamp in a vehicle.

Referring to FIG. 4, the lamp controlling unit 100 may control the period of the luminance of the lamp 110 in the breathing mode. Here, the luminance of the lamp means a degree of brightness per unit area of a light source generated in the lamp 110.

For example, when it is assumed in FIG. 4 that a maximum luminance of the lamp is 1 (100%), $L_1$, which is a first luminance, is brightness of about 0.1 to 0.2 (10 to 20%) of a maximum luminance, and $L_2$, which is a second luminance, is brightness of about 0.5 to 0.6 (50 to 60%) of the maximum luminance.

Here, the maximum luminance (1 or 100%) of the lamp 110 means brightness when the lamp is turned on in the operating mode. The luminance of the lamp has a period ($\Delta T$) over time, and the period ($\Delta T$) of the luminance may be adjusted. The period ($\Delta T$) of the luminance is averagely 0.8 to 1.2 seconds, and the following Equation 1 may be satisfied in the period ($\Delta T$) of the luminance.

$$L_1\left\{\frac{2x}{\Delta T}\left(U(x) - U\left(x - \frac{\Delta T}{2}\right)\right) + \left(1 - \frac{2x - \Delta T}{\Delta T}x\right)\left(U\left(x - \frac{\Delta T}{2}\right) - U(x - \Delta T)\right)\right\}^2 + L_2 \quad \text{[Equation 1]}$$

$$U(z) = \begin{cases} 1; & z \geq 0 \\ 0; & z < 0 \end{cases}$$

The period ($\Delta T$) of the luminance of the lamp is increased or decreased over time, thereby making it possible to recognize the turning on/off of the lamp 110 in the vehicle when the driver or the passenger enters or exits the vehicle and improve the sensitivity quality of the driver or passenger.

In addition, the period ($\Delta T$) of the luminance of the lamp may be varied depending on a speed measured by the speed measuring unit. That is, as the speed of the vehicle is increased, the period ($\Delta T$) of the luminance of the lamp is decreased.

As described above, it is possible to recognize the turn on/off of the lamp 110 in the vehicle when the driver or the passenger enters or exits the vehicle and improve the sensitivity quality of the driver or passenger.

The description of this disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:
1. A system for controlling a lamp in a vehicle, the system comprising:
   a lamp controlling unit configured to receive a door opening signal or a door closing signal of the vehicle or receive a start on or off signal of the vehicle and to change a mode of the lamp into a standby mode, a breathing mode, or an operating mode, wherein the lamp controlling unit is configured to change the mode of the lamp into the breathing mode when the lamp controlling unit receives the door opening signal or the door closing signal from the vehicle; and a lamp configured to be driven depending on the lamp controlling unit.

2. The system for controlling a lamp in a vehicle according to claim 1, wherein the lamp controlling unit includes a breathing mode controlling unit configured to adjust a period of a luminance of the lamp.

3. The system for controlling a lamp in a vehicle according to claim 1, further comprising a selection switch configured to allow the lamp to be turned on or turned off depending on an input of a driver or a passenger of the vehicle.

4. The system for controlling a lamp in a vehicle according to claim 1, wherein a period of a luminance of the lamp is adjusted depending on a speed of the vehicle.

5. The system for controlling a lamp in a vehicle according to claim 1, wherein the lamp repeatedly becomes bright and dark at a predetermined period while in the breathing mode, and the breathing mode is maintained for dozens of seconds when no other external inputs are present.

6. A method for controlling a lamp in a vehicle when a driver enters the vehicle, the method comprising:
    allowing the lamp in the vehicle to enter a standby mode;
    controlling, by a lamp controlling unit, the lamp in the vehicle to enter a breathing mode when a door of the vehicle is opened; and
    allowing the lamp to enter an operating mode when a predetermined time elapses in a state in which the lamp in the vehicle is in the breathing mode and allowing the lamp to immediately enter the operating mode when an external input is received or the vehicle starts on before the predetermined time elapses in the state in which the lamp in the vehicle is in the breathing mode.

7. The method for controlling a lamp in a vehicle according to claim 6, wherein a period of a luminance of the lamp is adjusted depending on a speed of the vehicle.

8. The method for controlling a lamp in a vehicle according to claim 6, wherein the lamp is selected to be turned on or turned off depending on an external input of the driver in the vehicle.

9. The method for controlling a lamp in a vehicle according to claim 6, wherein the lamp repeatedly becomes bright and dark at a predetermined period while in the breathing mode, and the breathing mode is maintained for dozens of seconds.

10. A method for controlling a lamp in a vehicle when a driver exits the vehicle, the method comprising:
    maintaining, by a lamp controlling unit, an operating mode of the lamp when an ignition of the vehicle is turned off;
    maintaining, by the lamp controlling unit, the operating mode of the lamp when a door of the vehicle is opened;
    controlling, by the lamp controlling unit, the lamp in the vehicle to enter a breathing mode when the door of the vehicle is closed; and
    allowing the lamp to enter a standby mode when a predetermined time elapses in a state in which the lamp in the vehicle is in the breathing mode.

11. The method for controlling a lamp in a vehicle according to claim 10, wherein when the door of the vehicle is opened before the predetermined time elapses in the state in which the lamp in the vehicle is in the breathing mode, the lamp is maintained in the breathing mode for another predetermined time.

12. The method for controlling a lamp in a vehicle according to claim 10, wherein the lamp is selected to be turned on or turned off depending on an external input of the driver or a passenger in the vehicle.

13. The method for controlling a lamp in a vehicle according to claim 10, the lamp repeatedly becomes bright and dark at a predetermined period while in the breathing mode, and the breathing mode is maintained for dozens of seconds.

* * * * *